Nov. 5, 1935.   G. A. LYON   2,019,986
TIRE COVER CONSTRUCTION
Filed March 2, 1931   2 Sheets-Sheet 1
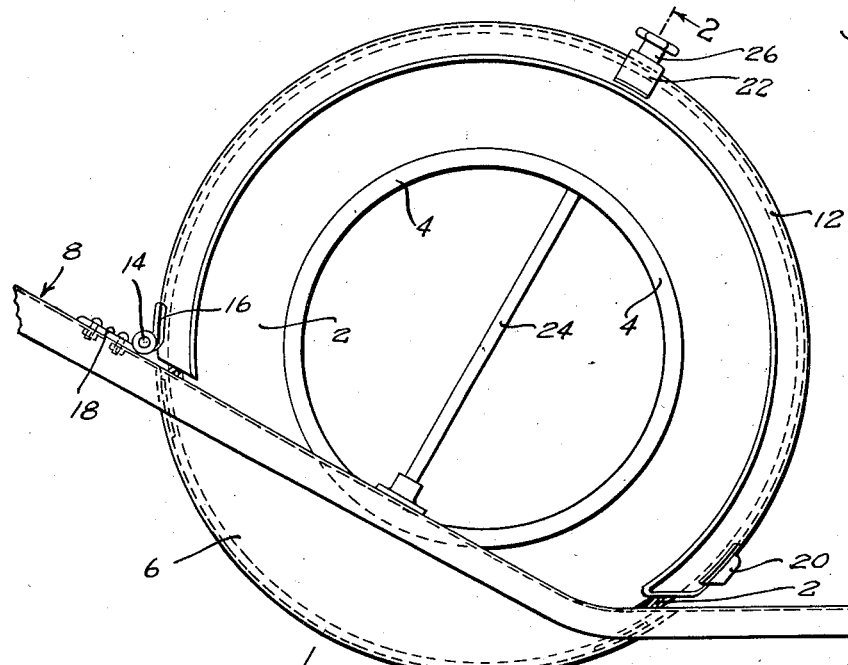
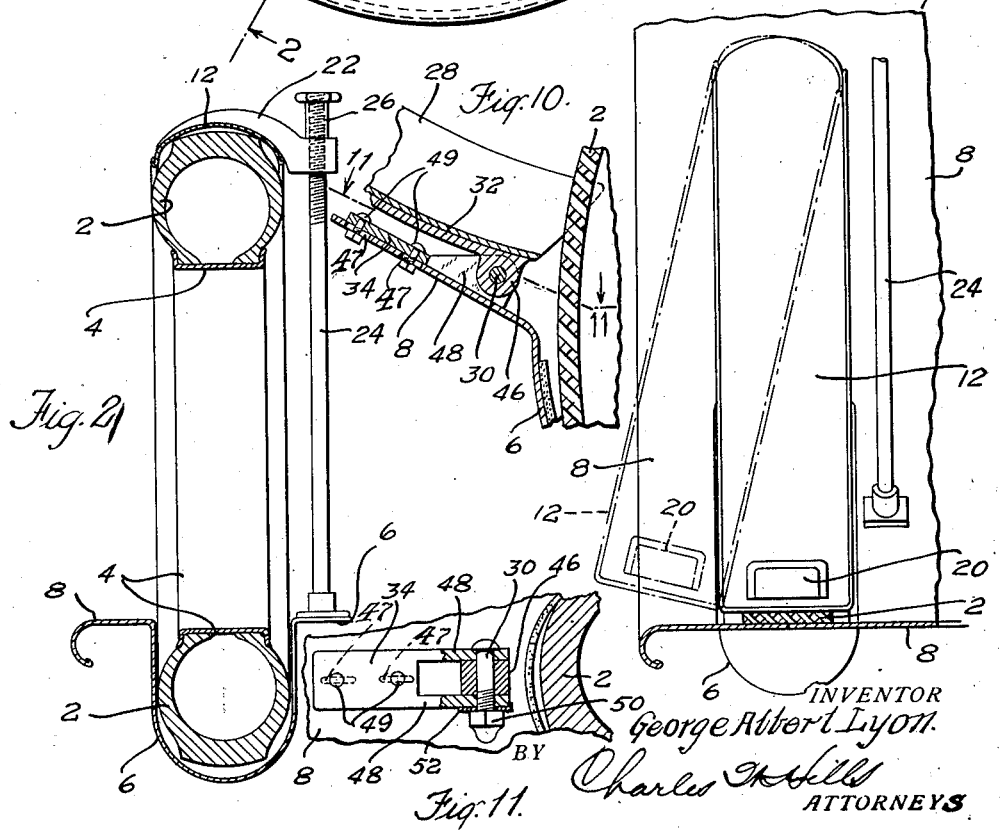

Nov. 5, 1935.　　　　G. A. LYON　　　　2,019,986
TIRE COVER CONSTRUCTION
Filed March 2, 1931　　　2 Sheets-Sheet 2
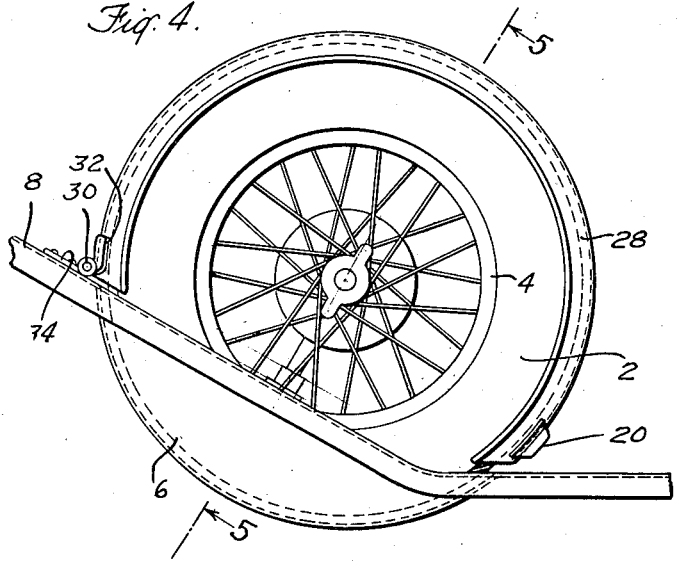
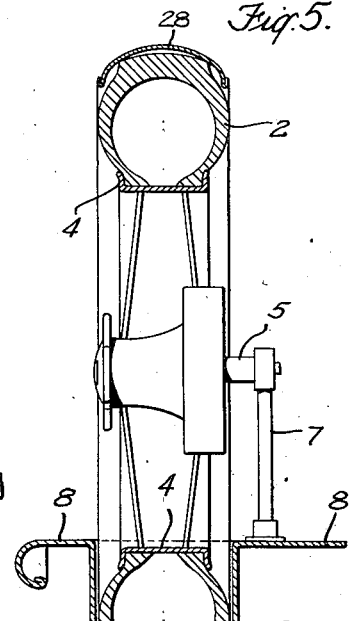
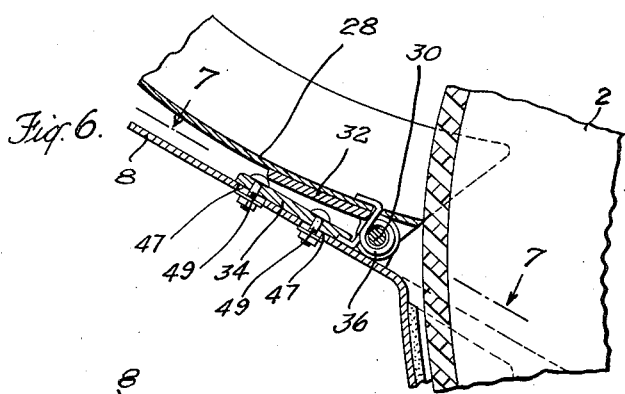
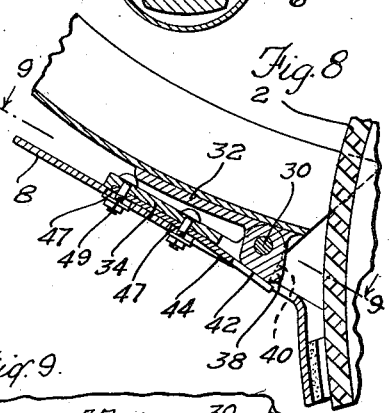
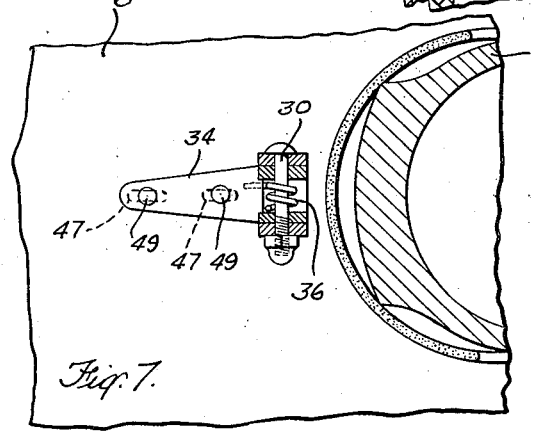
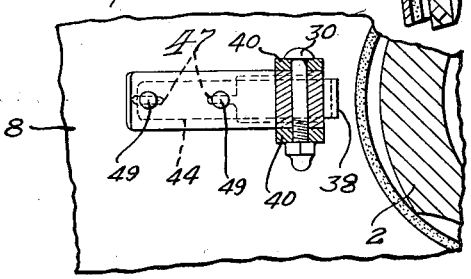
INVENTOR
George Albert Lyon.
BY Charles H. Mills
ATTORNEYS Patented Nov. 5, 1935

2,019,986

UNITED STATES PATENT OFFICE 2,019,986

TIRE COVER CONSTRUCTION

George Albert Lyon, Allenhurst, N. J., assignor to Lyon Incorporated, Asbury Park, N. J., a corporation of Delaware Application March 2, 1931, Serial No. 519,341

4 Claims. (Cl. 150—54)

This invention relates to devices for covering the spare tires of automobiles, and more particularly to spare tire covering devices of the type comprising an enclosing casing made of metal or other relatively stiff material.

One object of the invention is to improve the construction and mode of operation of devices of the above type for covering spare tires, and to produce a novel and improved construction which will furnish an efficient and satisfactory cover having an attractive appearance for a spare tire supported in a fender well, and which may be quickly and easily applied to, and removed from the tire.

Another object of the invention is to produce a novel and improved construction for covering a tire supported in the fender well of an automobile, and for holding the tire securely in position in the well.

With the above objects in view, the invention comprises the novel and improved features, constructions and combinations of parts hereinafter described and particularly pointed out in the claims, the advantages of which will be evident to those skilled in the art.

The invention will be clearly understood from the accompanying drawings illustrating the invention in its preferred form and the following detailed description of the constructions therein shown.

In the drawings, Fig. 1 is a view in side elevation illustrating a construction embodying the invention;

Fig. 2 is a sectional view taken substantially on the line 2—2 of Fig. 1;

Fig. 3 is a view in front elevation of the construction, illustrating in dot-and-dash lines the position assumed by certain parts in applying the construction to, and removing the same from the tire;

Fig. 4 is a view in side elevation illustrating a modified form of the invention;

Fig. 5 is a sectional view taken substantially on the line 5—5 of Fig. 4;

Fig. 6 is a detail view in vertical section, taken thru the hinge of the tire cover and illustrating one construction for holding the cover in open position;

Fig. 7 is a sectional view taken substantially on the line 7—7 of Fig. 6;

Fig. 8 is a view similar to Fig. 6, illustrating another construction for holding the cover in open position;

Fig. 9 is a sectional view taken substantially on the line 9—9 of Fig. 8;

Fig. 10 is a view similar to Fig. 6, illustrating still another construction for holding the cover in open position; and Fig. 11 is a sectional view taken substantially on the line 11—11 of Fig. 10.

The invention is illustrated in the drawings as applied to a tire 2 mounted on a rim 4 and engaging in a recess or well 6 in the fender 8 of an automobile. As shown in Figs. 1, 2 and 3, the rim 4 constitutes a demountable rim of any of the ordinary constructions. As shown in Figs. 4 and 5, the rim 4 forms part of a demountable wire wheel. The wheel is mounted on a stud 5 secured to the upper end of a rod 7 attached to the automobile frame, the stud engaging in the hub of the wheel.

The tire covering and holding device, shown in Figs. 1, 2 and 3, serves the dual function of a cover for the tire and a "hold-down" device for holding the tire in the fender well. In the construction shown in these figures, the tire cover and "hold-down" device comprises a casing indicated at 12, of annular form for enclosing the portion of the tire extending above the fender well. This casing is made of relatively stiff sheet material and preferably consists of sheet metal shaped into the desired form. The casing 12, as shown, is annular in form and is constructed to extend from one end of the fender well substantially to the other end thereof about the periphery or tread of the portion of the tire projecting above the fender well. The tire cover member 12 has a concavo-convex form in cross section so as to fit over the tread portion of the tire, the tread of the tire engaging in the concavity in this member, as shown in Fig. 2. The cover member 12 is formed to extend transversely across the tread portion of the tire and to project for some distance beyond the tread portion at its margins.

The annular cover member 12 is preferably made of resilient material sufficiently flexible to enable the same to be expanded in applying the same to, and removing it from a tire and has an inside diameter somewhat less than the diameter of the tire tread so that it is expanded in applying the same to, or removing it from a tire. The resilience of the cover member will cause the same to contract upon the tire into substantially the position shown in the drawings when it is released. This member also is preferably constructed to extend more than half way about the periphery of the tire, the distance between the ends of said member being somewhat less than the diameter of the tire to which it is applied.

The cover member 12 is pivoted to the fender to swing on an axis substantially parallel with the axis of the tire so that it may be swung back to the left, Fig. 1, into position to permit the removal of the tire from the fender well. The cover member is pivoted to the fender upon a pivot pin 14 passing thru suitable openings in projections on a hinge bracket 16 attached to the member 12, and thru openings in corresponding projections on a hinge bracket 18, secured to the fender 8. This manner of mounting the cover member enables the same to be swung in a plane substantially parallel with the central plane of the tire.

In removing the cover member from the periphery of the tire, the free end portion of said member is grasped and bent radially outwardly away from the axis of the tire and is also bent transversely of the central plane of the tire with relation to the remaining portion or body of said member shown in dot-and-dash lines in Fig. 3. The cover member is manipulated in a severe manner in applying the same to a tire. In order to facilitate this manner of manipulating the cover member, a handle 20 is mounted on the free end of said member. This handle is so constructed that the fingers may be inserted within the same from below.

The member 12 will be held firmly in engagement with the periphery of the tire by the yielding contraction of said member produced by the resilience of the material. In order to assist in holding the tire firmly in the fender well, a pressure member 22 is mounted on a rod 24 and is arranged to extend over and engage the upper surface of the cover member 12, said pressure member being provided with a recess in its lower face having a concave surface to receive the convex upper surface of the cover member. The member 22 is provided with an opening to receive loosely the rod 24, and is movable longitudinally of the rod. The rod 24, as shown in Figs. 2 and 3, is secured to the frame of the automobile at a point opposite the central part of the fender well and extends obliquely upwardly in a direction substantially parallel with the central plane of the tire. A nut 26 is threaded upon the upper end of the rod and is arranged to engage the pressure member 22 to force the same downwardly against the cover member 12. By turning down the nut 26, the member 22 is forced downwardly against the cover member 12, and the cover member is forced downwardly therewith to force the lower portion of the tire firmly into engagement with the bottom of the fender well.

Before inserting the tire in the fender well, the nut 26 and the pressure member 22 are removed from the rod 24 and the cover member 12 is swung back to the left into open position. After the tire is placed in the well, the cover member is swung back to the right and is worked progressively over the periphery of the tire, the cover being bent transversely as shown in Fig. 3, and expanded in the operation. Upon its release, said member is contracted by its own resilience into engagement with the tire tread. The pressure member 22 is then applied over the rod 24 and the nut 26 is threaded on the upper end of the rod and turned down against the pressure member to force down the cover member to hold the tire securely in the fender well. In removing the tire cover from the tire, the nut 26 is first unscrewed from the rod 24 and the member 22 is removed from the rod. The cover member 12 is then expanded and the free end portion thereof is bent laterally in the manner shown in Fig. 3, and said member is worked progressively off the periphery of the tire until it may be swung back to open position.

In the construction shown in Figs. 4 and 5, the wheel with the tire mounted on the rim 4, is held in position in the fender well by the engagement of the stud 5 in the hub of the wheel. The tire cover construction shown in these figures comprises a cover member 28 having substantially the same construction, arrangement and mode of operation as the cover member 12. The member 28, however, is held in operative tire covering position entirely by the resilience of the material of said member, no pressure member being employed in connection with this construction.

The wheel and the tire supported thereon are securely held in position by the stud 5 and the cover member 28 serves primarily as a cover for the tire. As shown, the cover member 28 is pivoted to the fender upon a pivot pin 30 passing thru suitable openings in a hinge bracket 32, secured to the cover member and thru corresponding openings in a hinge bracket 34 secured to the fender.

In connection with the construction shown in Figs. 4 and 5, means is preferably provided for holding the cover in open position. Figs. 6 to 11, inclusive, show different constructions which may be employed to effect this result.

In the construction shown in Figs. 6 and 7, the cover member 28 is held in open position by means of a coiled spring 36, one end of which passes thru an opening in the cover member 28 and engages the inner surface of said member, and the other end of which engages beneath a part of the hinge bracket 34, as shown in Fig. 6. This spring tends to swing the cover member in a direction to hold the same in open position, said cover member being moved into closed or operative position against the tension of the spring.

In the construction shown in Figs. 8 and 9, the hinge bracket 32 is provided with a projection 38 engaging between spaced projections 40 on the hinge bracket 34. The projection 38 is formed with a substantially flat surface 42, which is engaged by the free end of a spring plate 44, secured between the bracket 34 and the fender, to hold the cover member in open position. In closing the cover member, the free end of the spring plate 44 is swung back by the turning movement of the projection 38.

In the construction shown in Figs. 10 and 11, the cover member 28 is pivoted to the fender by means of a friction hinge which holds the cover member in open position. As shown in these figures, the hinge bracket 32 is provided with a projection 46 which engages between spaced projections 48 on the hinge bracket 34. The projections 48 are made of sufficient length to render them flexible and to enable them to be pressed inwardly into frictional contact with the outer surfaces of the projection 46. The pivot 30 passing thru the projections 46 and 48 to connect pivotally the two brackets, consists of a bolt upon which is threaded a nut 50 engaging a washer 52 interposed between the same and the adjacent projections 48. The nut 50 is turned down against the washer 52 with sufficient force to cause the projections 48 to exert considerable pressure upon the projection 46. With this construction, the friction between the projection 46 and the projections 48 will be sufficient to hold the cover member 28 in open position.

In constructions such as that shown in Figs. 4 and 5, the position of the stud 5 with relation to the fender well in different automobiles often varies. To compensate for these variations in the position of the stud 5, the tire cover construction shown in these figures is preferably provided with means by which the end of the cover member which is pivoted to the fender, may be adjusted toward and from the axis of the tire. In the construction shown in Figs. 6 to 11, inclusive, this adjustment is provided for by forming the fender 8 with slots 47 extending in the general direction of the central plane of the tire, thru which slots are passed the bolts 49, for securing the bracket 34 to the fender.

The tire cover constructions shown in the drawings are highly ornamental and attractive in appearance and constitute effective coverings for the tire to protect the same from mud and dirt and exposure to the weather and also against injury from accidental contacts.

The construction shown in Figs. 1, 2 and 3 not only forms a satisfactory and efficient cover and "push-down" or "hold-down" device for inflated tires, but will operate much more effectively than prior "hold-down" devices in holding deflated tires in position in a fender well, because of the extended surface of the tire engaged by the "hold-down" device. In this construction the tire is not only held firmly in the fender well so that it will not be displaced in the general direction of the plane thereof, but the tire is effectively held from lateral movement or vibration.

It is to be understood that the invention is not limited to the particular construction and arrangement of parts of the illustrated embodiments of the invention, but that the invention may be embodied in other forms within the scope of the claims.

Having explained the nature and object of the invention and having specifically described a construction embodying the invention in its preferred form, what is claimed is:

1. In combination with an automobile fender having a well for receiving a spare tire, a cover arranged to extend about a peripheral portion of the tire, means for pivoting one end of said cover to the fender, and means for adjusting said end toward and away from the well independently of the pivoting movement of the cover.

2. In combination with an automobile fender having a well for receiving a spare tire, a cover arranged to extend about a peripheral portion of the tire, means for pivoting one end of said cover to the fender, means for adjusting said end toward and away from the well independently of the pivoting movement of the cover, and means constantly urging said cover to open position.

3. In combination with an automobile fender having a well for receiving a spare tire, a cover arranged to extend about a peripheral portion of the tire, means for pivoting one end of said cover to the fender, means for adjusting said end toward and away from the well independently of the pivoting movement of the cover, and a device for holding said cover yieldably in selectively open and closed positions.

4. In combination with an automobile fender having a well for reeciving a spare tire, a cover arranged to extend about a peripheral portion of the tire, means for pivoting one end of said cover to the fender, means for adjusting said end toward and away from the well independently of the pivoting movement of the cover, and a spring toggle device for holding said cover yieldably in selectively open and closed positions.

GEORGE ALBERT LYON.